United States Patent
Tanaka et al.

(10) Patent No.: US 9,985,491 B2
(45) Date of Patent: May 29, 2018

(54) STATOR COIL, AXIAL GAP-TYPE ROTATING ELECTRIC MACHINE, AND METHOD FOR MANUFACTURING SAME

(71) Applicant: Hitachi, Ltd., Chiyoda-ku, Tokyo (JP)

(72) Inventors: Yuichiro Tanaka, Tokyo (JP); Koichi Watanabe, Tokyo (JP); Satoshi Kikuchi, Tokyo (JP); Akihito Nakahara, Tokyo (JP); Kenta Deguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 15/108,952

(22) PCT Filed: Dec. 3, 2014

(86) PCT No.: PCT/JP2014/082016
§ 371 (c)(1),
(2) Date: Jun. 29, 2016

(87) PCT Pub. No.: WO2015/107791
PCT Pub. Date: Jul. 23, 2015

(65) Prior Publication Data
US 2016/0329766 A1    Nov. 10, 2016

(30) Foreign Application Priority Data
Jan. 15, 2014 (JP) .................. 2014-004701

(51) Int. Cl.
*H02K 21/12* (2006.01)
*H02K 3/28* (2006.01)
(Continued)

(52) U.S. Cl.
CPC .............. *H02K 3/28* (2013.01); *H02K 1/182* (2013.01); *H02K 1/2793* (2013.01); *H02K 3/12* (2013.01);
(Continued)

(58) Field of Classification Search
CPC ........ H02K 16/00; H02K 16/02; H02K 21/24; H02K 3/28; H02K 3/12; H02K 15/045;
(Continued)

(56) References Cited

U.S. PATENT DOCUMENTS 8,878,413 B2 *  11/2014  Wolf ........................ H02K 3/28
                                                          310/195
2008/0272666 A1 * 11/2008  Halstead .................. H02K 3/04
                                                          310/156.36
(Continued)

FOREIGN PATENT DOCUMENTS

GB        2 358 523 A      7/2001
JP      2006-288074 A     10/2006
(Continued)

OTHER PUBLICATIONS

International Search Report (PCT/ISA/210) issued in PCT Application No. PCT/JP2014/082016 dated Mar. 3, 2015 with English translation (Three (3) pages).
(Continued)

Primary Examiner — Thanh Lam
(74) Attorney, Agent, or Firm — Crowell & Moring LLP

(57) ABSTRACT

Stator coils each consist of a plurality of rectangular conductor coil pieces, the adjacent connection ends of which are connected to each other on the outer diameter side of a stator. The coil pieces each have: a folded portion folded in a rotation axis direction on the inner diameter side of the stator; inner diameter-side open leg portions opened from both sides of the folded portion toward the circumferential directions of the rotation axis; linear portions each bent from each of the inner diameter-side open leg portions and disposed so as to pass through the stator from the inner diameter side to the outer diameter side; and an outer diameter-side open leg portions opened from the linear portions toward the circumferential directions of the rotation (Continued)

axis and extending to the connection ends. The inner diameter-side open leg portions extending to the folded portion have a correction portion for correcting the position of the rectangular conductor and are formed so as to align the connection end extending to the correction portion with the connection end of the adjacent coil piece.

12 Claims, 11 Drawing Sheets

(51) Int. Cl.
*H02K 21/24* (2006.01)
*H02K 3/12* (2006.01)
*H02K 1/18* (2006.01)
*H02K 1/27* (2006.01)
*H02K 3/48* (2006.01)

(52) U.S. Cl.
CPC ............... *H02K 3/48* (2013.01); *H02K 21/24* (2013.01); *H02K 2213/03* (2013.01)

(58) Field of Classification Search
CPC .. H02K 3/50; H02K 3/04; H02K 3/38; H02K 15/066; H02K 15/0081
USPC .............. 310/156.32, 156.37, 268, 201, 202, 310/206–208, 112, 114
See application file for complete search history.

(56) References Cited

U.S. PATENT DOCUMENTS

| | | | |
|---|---|---|---|
| 2009/0200889 A1* | 8/2009 | Halstead | H02K 3/04 310/208 |
| 2012/0228984 A1* | 9/2012 | Koga | H02K 3/12 310/208 |
| 2014/0015367 A1* | 1/2014 | Umehara | H02K 3/12 310/208 |
| 2014/0232233 A1* | 8/2014 | Fukushima | H02K 3/28 310/201 |

FOREIGN PATENT DOCUMENTS

| | | |
|---|---|---|
| JP | 2010-284001 A | 12/2010 |
| WO | WO 01/47089 A2 | 6/2001 |

OTHER PUBLICATIONS

Japanese-language Written Opinion (PCT/ISA/237) issued in PCT Application No. PCT/JP2014/082016 dated Mar. 3, 2015 (Four (4) pages).

* cited by examiner

← BENT BY 90°
  CONNECTION AT WIDE
  CROSS-SECTIONAL
  WIDTH SIDE PORTIONS OF COILS

← BENT BY 180°
  EXAMPLE OF OUTER DIAMETER
  SIDE SHAPE OF CONTINUOUSLY
  WOUND COIL

← HAVING STEP SHAPE
  EXAMPLE OF OUTER DIAMETER
  SIDE SHAPE OF CONTINUOUSLY
  WOUND COIL

STATOR COIL, AXIAL GAP-TYPE ROTATING ELECTRIC MACHINE, AND METHOD FOR MANUFACTURING SAME

TECHNICAL FIELD

The present invention relates to a structure of a stator coil having a decreased number of coil connection points in order to decrease the dimension and the manufacturing cost thereof.

BACKGROUND ART

An axial gap-type rotating electric machine obtains a rotational driving force from magnetic forces exerted on a surface of a rotor and a surface of a stator disposed so as to face an end surface of the rotor in the axis direction with a void gap interposed therebetween.

Hitherto, there is known a structure of a stator coil disposed in a stator in the axial gap-type rotating electric machine. Patent Document 1 discloses a stator coil in which a plurality of coil pieces is connected to each other in the circumferential direction of a rotation shaft so as to form a coil loop. That is, there is disclosed an axial gap-type rotating electric machine 1 including a stator 2 and a rotor 9 disposed so as to face each other with a void gap s interposed therebetween in order to improve the efficiency of the torque and the rotation speed generated in the rotating electric machine while suppressing an increase in the volume of the reluctance type rotating electric machine.

The stator 2 is provided with a plurality of conductor bars 5 allocated to each phase of AC signals and having conductive ends connected to each other, and the conductor bars 5 are disposed so as to respectively match magnetic poles of a permanent magnet 10 disposed in the rotor 9 (see Abstract).

Further, Patent Document 2 discloses a stator coil in which one end of each of the coil pieces is locked by a base member and the other ends of the coil pieces are connected by a connection terminal. With this configuration, it is advantageous in that one end of the coil piece does not need to be welded and the other end of the coil piece does not need to be welded.

CITATION LIST

Patent Document

Patent Document 1: JP 2006-288074 A
Patent Document 2: JP 2010-284001 A

SUMMARY OF THE INVENTION

Problems to be Solved by the Invention

In the configuration of Patent Document 1, if the conductor bar is formed by an insulation-coated copper rectangular wire and the ends of the coil at the inner diameter side and the outer diameter side are connected to each other by TIG welding, only the end at the inner diameter side cannot be connected. This is because a welding operation is not easily performed in that the connection portions at the inner diameter side are too close to each other and a welding torch cannot be provided at the inner diameter side of the coil. Since the welding portion protrudes toward the center of the coil even when the ends at the inner diameter side of the coil are welded to each other, the dimension of the inner diameter of the coil cannot be decreased. As a result, the dimension of the coil end increases and the dimension of the outer diameter of the rotating electric machine increases.

Even when the ends at the outer diameter side are connected to each other by welding, the welded connection area becomes smaller than the cross-sectional area of the conductor in that the front ends of the conductor bars are connected to each other. If the connection area is small, the coil is heated when an excitation current flows thereto. As a result, there is a concern that a sufficient current may not flow to the coil. In order to increase the welded connection area so that the welded connection area becomes equal to or larger than the cross-sectional area of the conductor, the outer diameter side end of the coil needs to be stretched in the radial direction. As a result, a problem arises in that the dimension of the outer diameter of the rotating electric machine increases.

In Patent Document 2, since one end of each of the coil pieces protrudes toward the coil center and the base member locking the protruding one end is disposed at the inner diameter side of the coil, the dimension of the inner diameter of the coil cannot be decreased. As a result, the dimension of the coil increases and the dimension of the outer diameter of the rotating electric machine increases. Meanwhile, since the connection terminal connected to the other ends of the coil pieces is disposed at the outer peripheral side of the coil, the outer periphery of the coil increases in size and hence the dimension of the outer diameter of the rotating electric machine increases. Further, since the base member and the connection terminal are needed at the inner and outer peripheries of the coil, the manufacturing cost increases.

The invention is made in view of the above-described problems of the related art and an object of the invention is to provide a stator coil, an axial gap-type rotating electric machine, and an axial gap-type rotating electric machine manufacturing method capable of decreasing the number of coil connection points without forming a locking member or a connection portion for a coil piece at an inner diameter side of a stator coil so as to decrease the dimension and the manufacturing cost thereof.

Solutions to Problems

In order to solve the above-described problems, according to an aspect of the invention, there is provided a stator coil disposed in a stator of an axial gap-type rotating electric machine rotating a rotor, including: a plurality of coil pieces as rectangular conductors disposed in the circumferential direction of a rotation shaft of the rotor and formed by connecting adjacent connection ends to each other at the outer diameter side of the stator, wherein each coil piece includes a folded portion folded in the rotation axis direction at the inner diameter side of the stator, an inner diameter side open leg portion opened in the circumferential direction of the rotation shaft from both sides of the folded portion, a linear portion bent from each inner diameter side open leg portion so as to pass through the stator from the inner diameter side toward the outer diameter side, and an outer diameter side open leg portion opened in the circumferential direction of the rotation shaft from the linear portion and extending to the connection end, and wherein an inner diameter side open leg portion connected to the folded portion includes a correction portion correcting the position of the rectangular conductor and the connection end connected to the correction portion is evenly disposed with respect to a connection end of the adjacent coil piece.

Further, the coil piece forms a swelling portion by the folded portion and the inner diameter side open leg portion and the swelling portion is disposed at the inner diameter side of the stator so as to protrude in the axis direction opposite to the rotor.

Further, the inner diameter side open leg portion and the outer diameter side open leg portion of the coil piece are formed in a manner such that the portions are formed in circular-arc or linear shapes and are combined with each other.

In order to solve the above-described problems, according to another aspect of the invention, there is provided an axial gap-type rotating electric machine including: a rotor rotating about a rotation shaft; a stator disposed so as to face the rotor with a void gap interposed therebetween; and a stator coil disposed in the stator, wherein the stator coil is excited so as to rotate the rotor, wherein the stator coil is formed by a plurality of coil pieces as rectangular conductors disposed in the circumferential direction of the rotation shaft and formed by connecting adjacent connection ends to each other at the outer diameter side of the stator, wherein each coil piece includes a folded portion folded in the rotation axis direction at the inner diameter side of the stator, an inner diameter side open leg portion opened in the circumferential direction of the rotation shaft from both sides of the folded portion, a linear portion bent from each inner diameter side open leg portion so as to pass through the stator from the inner diameter side toward the outer diameter side, and an outer diameter side open leg portion opened in the circumferential direction of the rotation shaft from the linear portion and extending to the connection end, and wherein an inner diameter side open leg portion connected to the folded portion includes a correction portion correcting the position of the rectangular conductor and the connection end connected to the correction portion is evenly disposed with respect to the connection end of the adjacent coil piece.

In order to solve the above-described problems, according to still another aspect of the invention, there is provided a method for manufacturing an axial gap-type rotating electric machine including a rotor rotating about a rotation shaft, a stator disposed so as to face the rotor with a void gap interposed therebetween, and a stator coil disposed in a core slot of the stator, wherein the stator coil is formed by a plurality of coil pieces disposed in the circumferential direction of the rotation shaft, wherein each coil piece includes a folded portion folded in the rotation axis direction at the inner diameter side of the stator, an inner diameter side open leg portion opened in the circumferential direction of the rotation shaft from both sides of the folded portion, a linear portion bent from each inner diameter side open leg portion so as to pass through the stator from the inner diameter side toward the outer diameter side, and an outer diameter side open leg portion opened in the circumferential direction of the rotation shaft from the linear portion and extending to the connection end, comprising: assembling the stator coil in advance while adjacent connection ends of the coil pieces at the outer diameter side of the stator are connected to each other; disposing the previously assembled stator coil in the core slot of the stator; and disposing the rotor so as to face the stator having the stator coil disposed therein.

Effects of the Invention

According to the invention, the stator coil and the axial gap-type rotating electric machine can be decreased in size and manufacturing cost.

MODE FOR CARRYING OUT THE INVENTION

Hereinafter, a stator coil of an axial gap-type electric machine, an axial gap-type electric machine, and an axial gap-type electric machine manufacturing method according to the invention will be described with reference to FIGS. 1 to 19.

First Embodiment

In the embodiment, the number of the coil connection points is decreased while a connection portion is not provided at the inner diameter side of the stator coil and hence the diameter of the stator coil is decreased.

Figure 1:
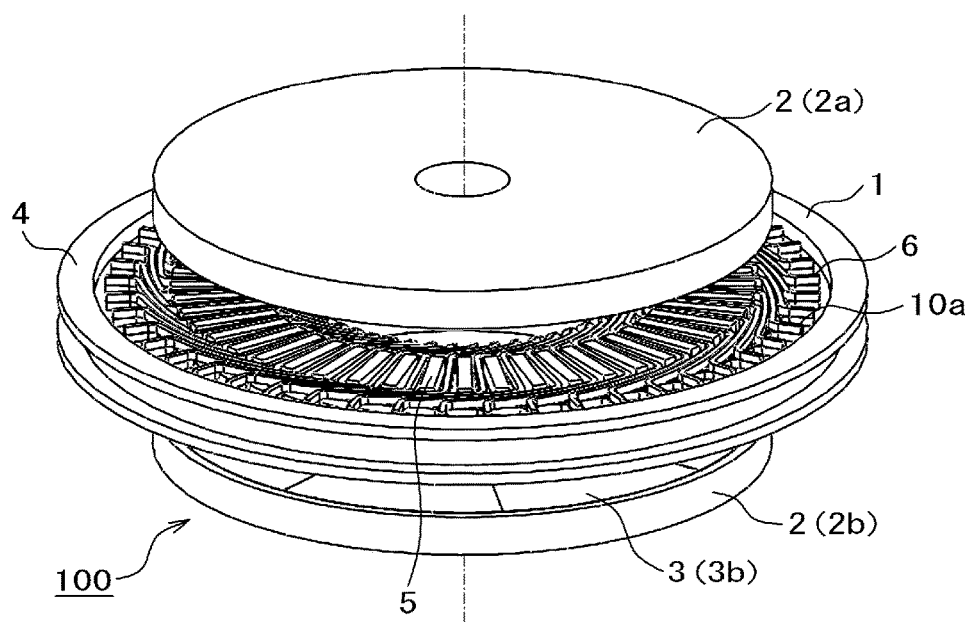
FIG. 1 is a schematic diagram illustrating an axial gap-type rotating electric machine according to an embodiment of the invention.
Figure 2:
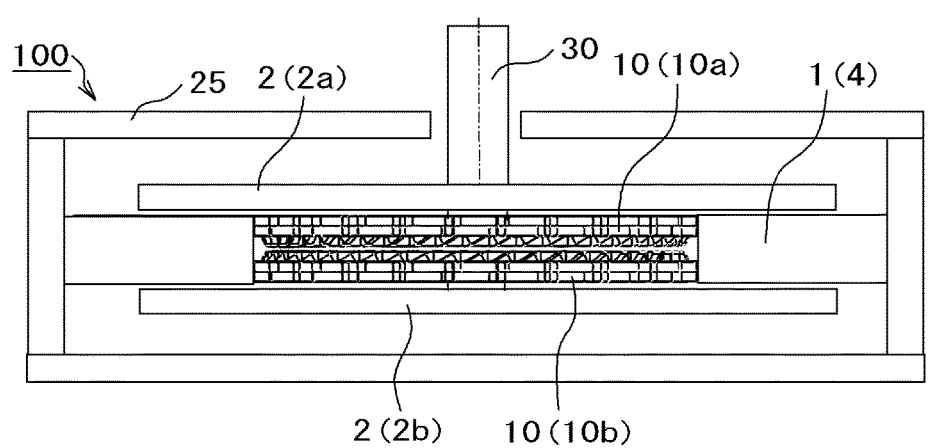
FIG. 2 is a cross-sectional view of FIG. 1.
Figure 6:
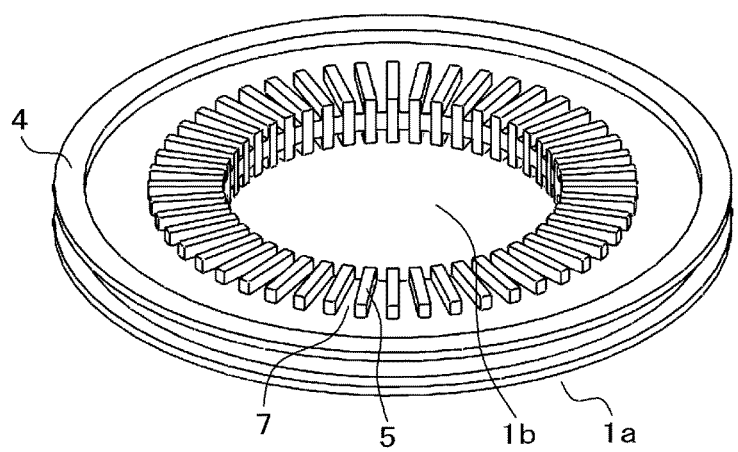
FIG. 6 is a schematic diagram illustrating the configurations of a holding member, a core, and a slot of the stator.

FIG. 1 is a schematic diagram illustrating an axial gap-type rotating electric machine with 48 slots according to the embodiment and FIG. 2 is a cross-sectional view thereof. In an axial gap-type rotating electric machine 100, for example, a plurality of rectangular cores 5 formed by laminating silicon steel sheets is disposed in an annular shape and is fixed to a holding member 4 so as to form a stator 1. As illustrated in FIG. 6, the cores 5 are inserted from the inner diameter side of the holding member 4 and are disposed in an annular shape so as to protrude toward both upper and lower surfaces. By the adjacent cores 5, a core slot 7 is formed.

Further, the disk-shaped stator 1 is formed by disposing annular stator coils 10a and 10b formed as copper rectangular wire conductors (rectangular conductors) insulation-coated by enamel or the like in the core slot 7 formed by the cores 5 at both upper and lower surfaces of the holding member 4. Reference Signs 10a and 10b respectively indicate stator coils disposed at both upper and lower surfaces of the stator 1. As will be described later, the stator coil 1 is formed in an annular shape by bonding a plurality of coil pieces 6. As apparent from the drawings, the core 5 has a square cross-sectional shape, but the invention is not limited thereto. For example, the cross-sectional shape can be appropriately changed to an angular shape such as a trapezoid or a triangle.

Further, two rotors 2a and 2b are disposed at both upper and lower surfaces of the stator 1 so as to face each other in a rotatable state. The upper and lower rotors 2a and 2b are connected to each other by a rotation shaft 30 disposed at the center of the rotating electric machine and are disposed so as to face both surfaces of the stator 1 with a constant void gap (gap) interposed therebetween. In FIG. 2, Reference Sign 25 indicates a casing of the axial gap-type rotating electric machine 100. Here, the casing is used to fix the holding member 4 of the stator 1 and to rotatably support the rotation shaft 30.

Figure 3:
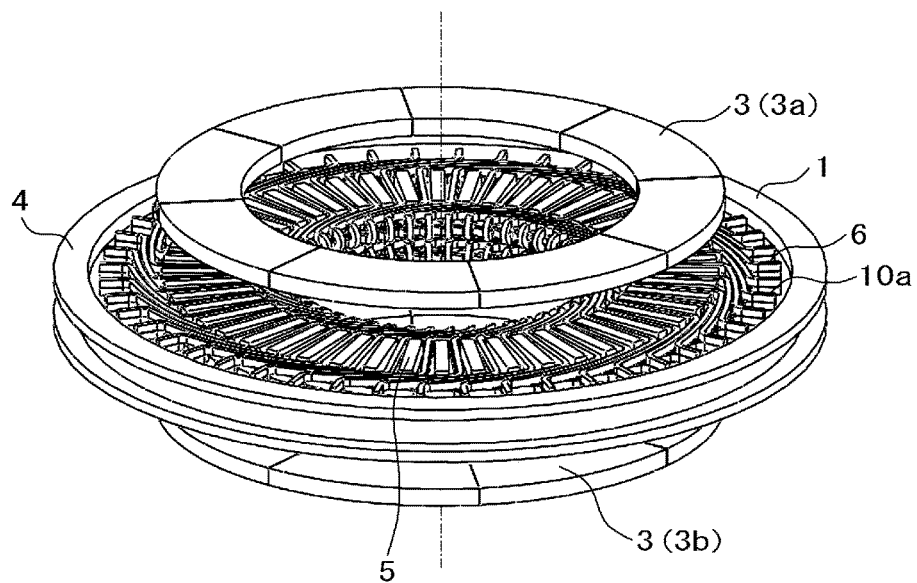
FIG. 3 is a schematic diagram illustrating a magnet inside a rotor of the rotating electric machine of FIG. 1.

FIG. 3 is a schematic diagram illustrating only a magnet of the rotor 2 in the axial gap-type rotating electric machine 100 of the embodiment of the invention. As illustrated in FIG. 3, N and S poles of a plurality of magnets 3 (in the embodiment, ferrite magnets) are alternately disposed in the circumferential direction on the surfaces of the rotors 2 facing both upper and lower surfaces of the stator 1. Furthermore, the axial gap-type rotating electric machine 100 described below is an example, and the number of the poles of the rotating electric machine and the number of the core slots can be appropriately changed.

Figure 4:
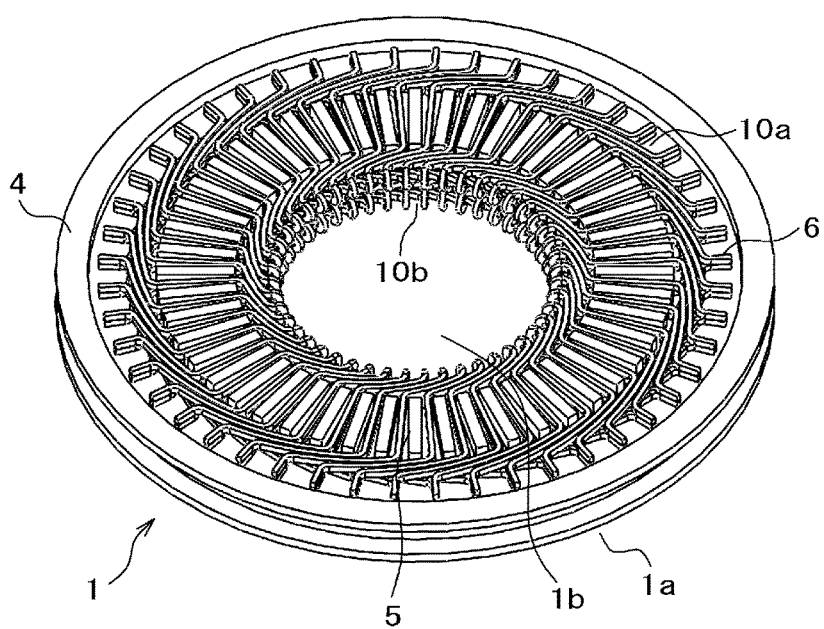
FIG. 4 is a perspective view illustrating a stator of the rotating electric machine.

FIG. 4 illustrates only the stator 1 of the axial gap-type rotating electric machine 100 of the embodiment of the invention. As described above, the stator 1 is formed by disposing the annular stator coils 10a and 10b formed as insulation-coated rectangular conductors in the periphery of the cores 5 at both upper and lower surfaces thereof. The stator coils 10 are disposed in each core slot 7 in two stages in an overlapping state in the rotation axis direction. Furthermore, Reference Signs 1a and 1b respectively indicate the outer diameter side (the outer peripheral side) and the inner diameter side (the inner peripheral side) of the stator 1 and the outer diameter side (the outer peripheral side) and the inner diameter side (the inner peripheral side) of the core.

The coil piece 6 includes a folded portion which is provided at the center portion so as to be folded in the rotation axis direction and the folded portion is disposed at the core inner diameter side. Further, the coil piece 6 is formed so that both ends thereof are disposed at the core outer diameter side and the ends of the adjacent coil pieces 6 are connected to each other, so that an annular electric circuit is obtained. Thus, since there is no need to provide a connection portion at the inner diameter side (the core inner diameter side) of the stator coil, the number of the connection points of the coil is decreased and hence the inner diameter of the coil can be decreased.

Figure 5:
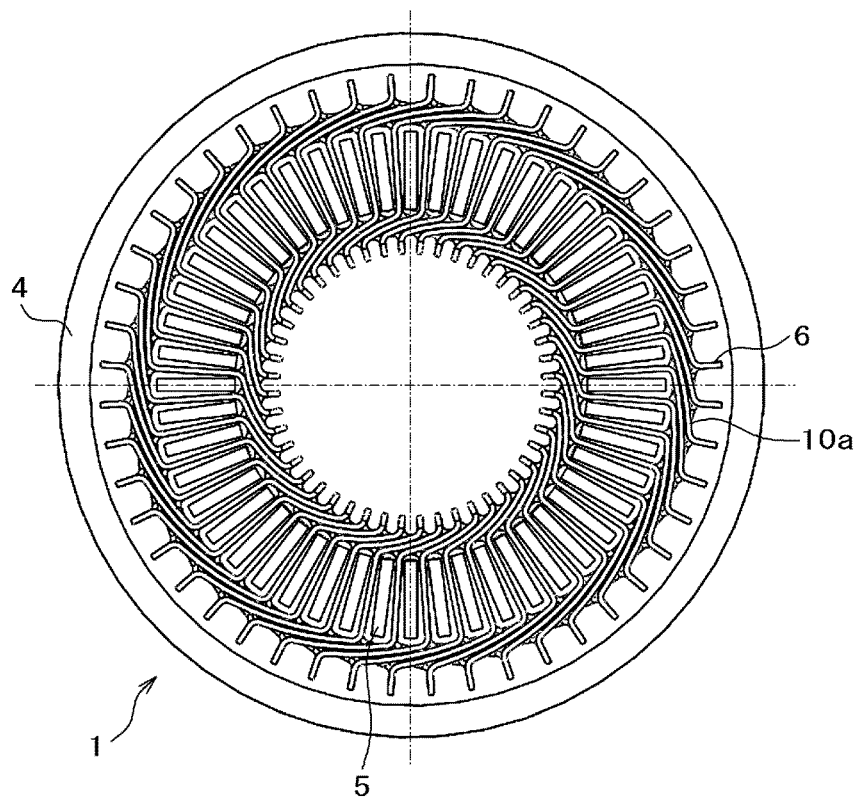
FIG. 5 is a schematic front view of the stator of FIG. 4.

FIG. 5 a schematic front view illustrating the stator 1 of the axial gap-type rotating electric machine 100 of the embodiment of the invention. As illustrated in FIG. 5, the coil pieces 6 of the stator coil 10a are disposed with a uniform gap in the radial direction of the rotation shaft. Since the axial gap-type rotating electric machine is formed so that the coil is disposed in an annular shape, the core inner diameter side has a small space volume used to process (a connection process such as welding) the ends of the coil piece compared to the core outer diameter side. In the embodiment, the connection portion is not provided at the core inner diameter side and the folded portion is folded in the axis direction so as to protrude toward the coil center (the stator center), so that a coil loop is obtained.

Further, the coil piece 6 is opened in the circumferential direction of the rotation shaft from the folded portion to the core slot at the core inner diameter side and is also opened in the circumferential direction of the rotation shaft at the core outer diameter side. As illustrated in FIG. 5, the open leg portions of the coil pieces 6 may have the same circular-arc shape and hence the coil pieces can be disposed densely in an overlapping state while having a uniform gap in the radial direction. As a result, it is possible to decrease the coil end dimensions at the inner diameter side and the outer diameter side of the rotating electric machine.

FIG. 6 is a schematic diagram illustrating the configurations of the core 5 and the holding member 4 of the axial gap-type rotating electric machine 100 of the embodiment of the invention. As described above, the cores 5 are formed by laminating silicon steel sheets and are disposed in an annular shape so as to protrude toward both upper and lower surfaces while being inserted into the holding member 4 from the inner diameter side. Although not illustrated in the drawings, the cores are mechanically fixed to the holding member 4 by using, for example, a sheet fastener or the like.

Figure 7:
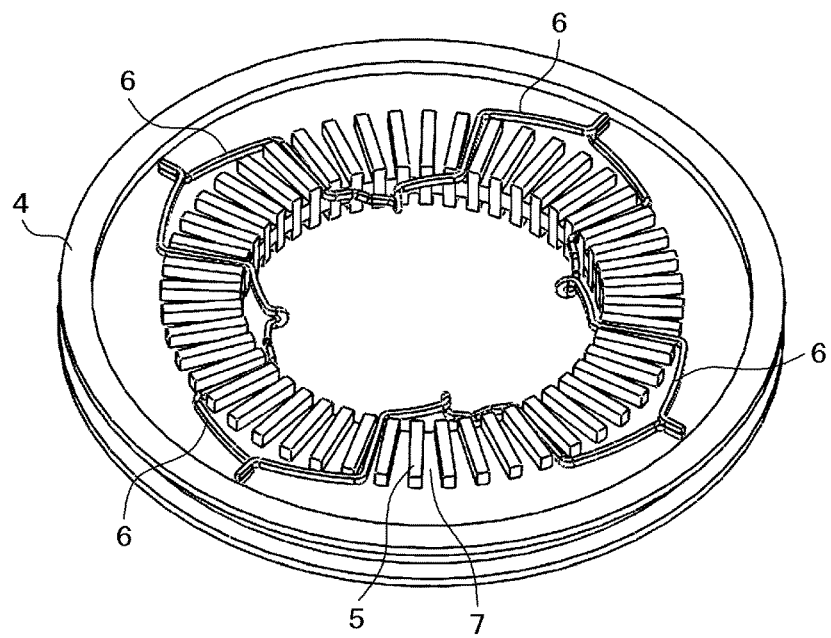
FIG. 7 is a schematic diagram illustrating a state where a single-phase coil is disposed in the stator.

FIG. 7 is a schematic diagram illustrating a state where a single-phase coil is disposed in the holding member 4 and the core 5 of the stator of the axial gap-type rotating electric machine 100 of the embodiment of the invention. As illustrated in FIG. 7, the core 5 is divided into upper and lower parts by the holding member 4, the core slot formed by the adjacent cores is also divided into upper and lower parts by the holding member 4, and the core slot 7 is formed at the upper and lower sides. In FIG. 7, since only one single-phase coil is provided, one conductor is disposed so as to pass through each core slot 7 from the inner diameter side toward the outer diameter side. In a state where all coils are disposed, four conductors are disposed in each slot so that two conductors of the coil piece are disposed in the upper slot and two conductors of the coil piece are disposed in the lower slot.

Figure 8:
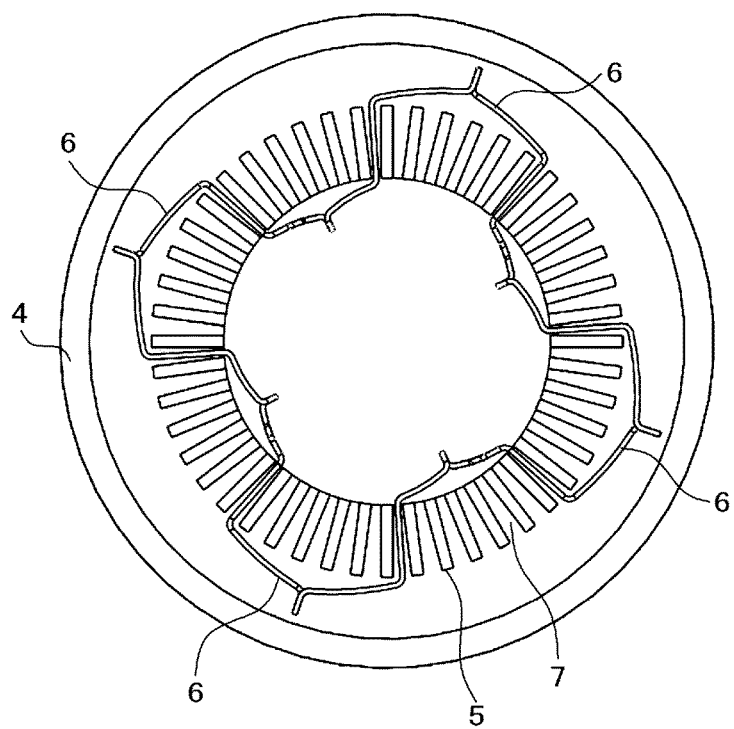
FIG. 8 is a schematic front view of the stator of FIG. 7.

FIG. 8 is a schematic front view of FIG. 7. In the embodiment, since the core 5 has a square shape (a rectangular shape), the coil piece 6 is a rectangular conductor, and the width of each core slot 7 in the circumferential direction of the rotation shaft is narrow at the inner peripheral side (the inner diameter side) and is wide at the outer peripheral side (the outer diameter side), a gap between the core 5 and the coil piece 9 is different at the inner and outer peripheral sides as illustrated in FIG. 8. Thus, in the axial gap-type rotating electric machine with this configuration, a gap between the core and the coil piece is small at the inner diameter side and is large at the outer diameter side. Thus, a magnetic resistance changes due to the gap. In order to keep a uniform gap between the core and the coil piece by solving this problem, the shape of the core 5 may be a trapezoidal or triangular shape.

Figure 9:
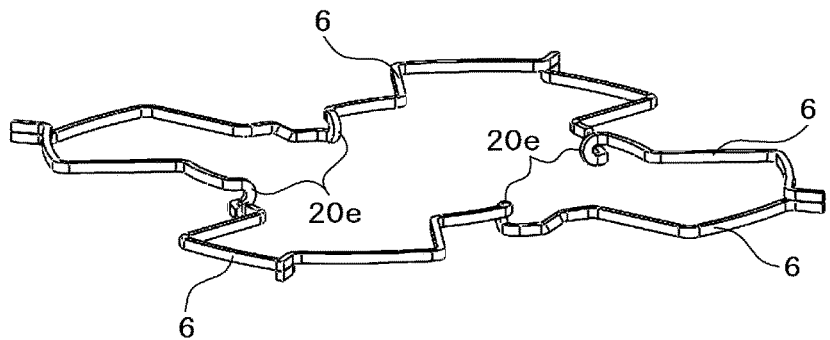
FIG. 9 is a perspective view illustrating the connection state of coil pieces of the single-phase coil of FIG. 8.

FIG. 9 illustrates a single-phase coil of the axial gap-type rotating electric machine 100 of the embodiment of the invention and the single-phase coil is formed by connecting four coil pieces 6. As described above, in a state where all coils are disposed, the conductor of the coil is disposed in two stages as the upper and lower layers (the rotation axis direction) in an overlapping state at the upper and lower slots of the stator in the axis direction. Then, the coil piece 6 is switched (displaced) to the upper and lower layers of the conductor inside the core slot by a folded portion 20e at the core inner diameter side. According to this configuration, the non-folded conductor of the coil piece is set as the upper layer of the axis direction, the conductor of the upper layer is displaced downward in the axis direction by the folded portion 20e, and hence the folded conductor can be set as the lower layer.

Figure 10A:
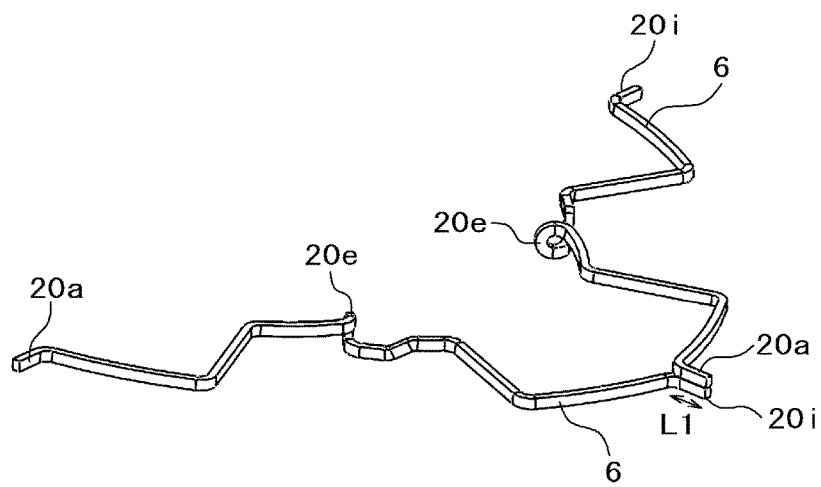
FIG. 10A is an explanatory diagram illustrating a state where two coil pieces are connected.
Figure 10B:
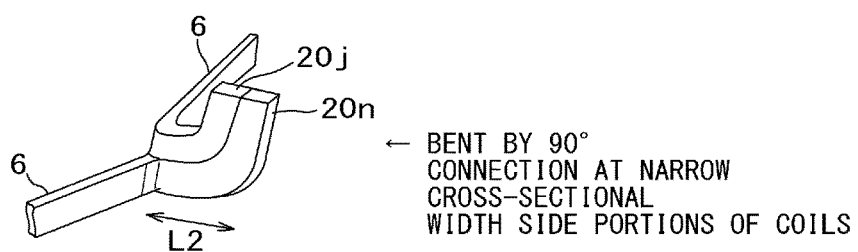
FIG. 10B is an explanatory diagram illustrating a state where coil pieces are bent by 90° and are connected to each other at the narrow cross-sectional width side portions.
Figure 10C:
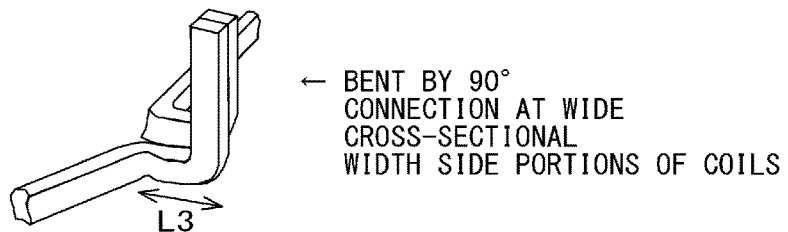
FIG. 10C is an explanatory diagram illustrating a state where coil pieces are bent by 90° and are connected to each other at the wide cross-sectional width side portions.

FIGS. 10A to 10C are schematic diagrams illustrating a state where two coil pieces 6 of the embodiment of the invention are connected to each other. As illustrated in FIG. 10A, the coil piece 6 includes the folded portion 20e which is folded in the rotation axis direction at the center portion so as to protrude toward the coil center (the stator center). By using the folded portion 20e, the position of the conductor inside the core slot 7 is set and the connection ends 20a and 20i are evenly arranged at the core outer diameter side.

When the connection ends of the coil piece 6 are connected to each other, there is a need to evenly arrange the side surfaces of the rectangular wire conductors (the short edges of the rectangular wires) in an overlapping state in the rotation axis direction in the case of the welding. Thus, when a molding operation is performed so that the lower end surface of the upper connection end 20a in the axis direction is located slightly below the upper end surface of the lower connection end 20i and the connection ends elastically contact each other in the rotation axis direction, the ends can be evenly arranged while stably overlapping each other. Furthermore, in order to ensure a connection area for a welding operation to be equal to or larger than the cross-sectional area of the conductor, the connection ends 20a and 20i of the coil piece 6 are caused to extend linearly by the radial length L1 of the rotation shaft. Since the linear end is fixed by the other members, the welding operation can be stably performed.

FIG. 10B illustrates a modified example in which the connection ends of the coil piece 6 are connected to each other. That is, the connection ends illustrated in FIG. 10A are bent upward by 90° in the rotation axis direction while not extending in the radial direction of the rotation shaft from the halfway position so as to form the connection ends 20j and 20n and the connection ends are connected to each other at the narrow cross-sectional width side portions. According to the ends 20j and 20n, since the radial length L2 of the connection end can be smaller than the radial length L1 of each of the connection ends 20a and 20i, the radial dimension of the stator coil is decreased and hence the radial dimension of the stator coil can be decreased.

In FIG. 10C, the connection ends of the coil piece 6 are bent upward in the rotation axis direction by 90° and are connected to each other at the narrow cross-sectional width side portions. The radial length L3 of the connection end can be smaller than the radial length L2.

Figure 10D:
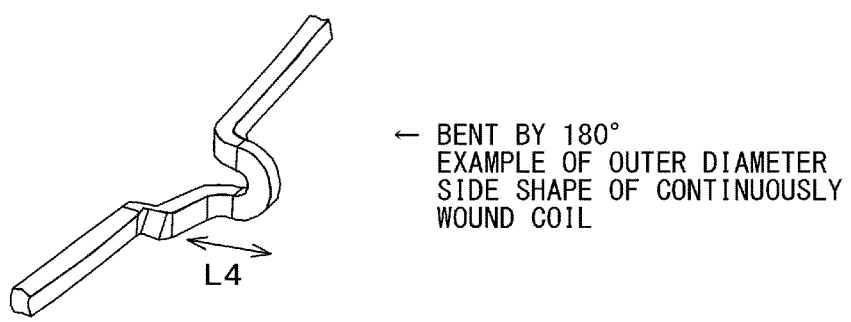
FIG. 10D is an explanatory diagram illustrating an outer diameter shape of a continuously wound coil which is bent by 180°.
Figure 10E:
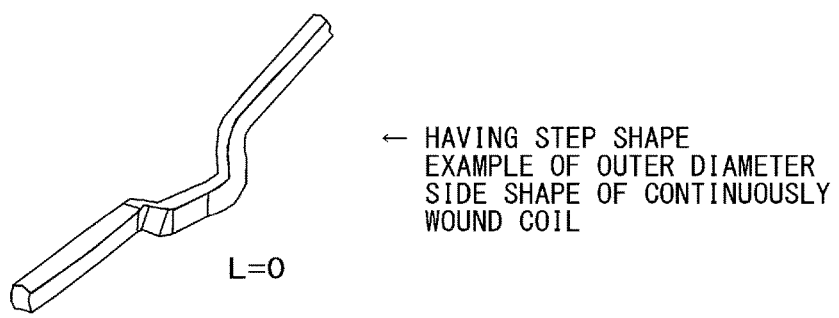
FIG. 10E is an explanatory diagram illustrating an outer diameter shape of a continuously wound coil which has a step shape.

FIGS. 10D and 10E illustrate the outer diameter side shape of the continuous wound coil of which the ends are continuous to each other (the ends are not connected to each other by welding or the like). In FIG. 10D, the outer diameter side shape is bent by 180° and the radial length is indicated by L4. In FIG. 10E, the outer diameter side shape has a step shape and the radial length L is set to 0. In FIG. 10E, the stator can have the smallest radial length.

Figure 11:
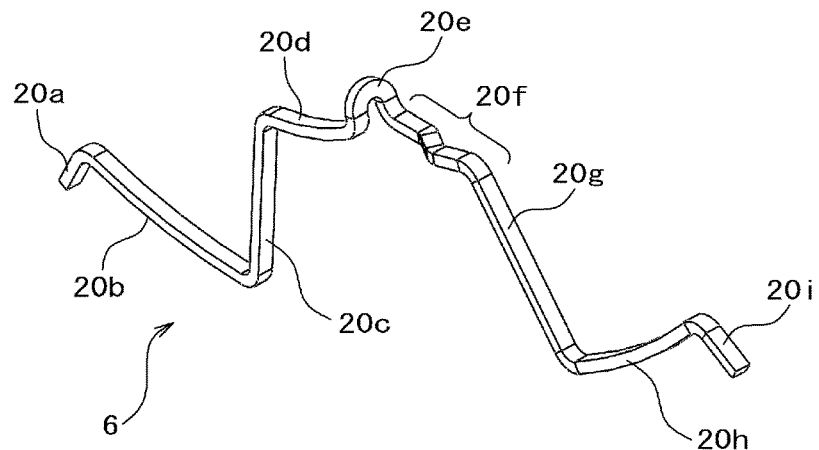
FIG. 11 is a perspective view illustrating a coil piece unit.

FIGS. 11, 12, 13, and 14 are schematic diagrams illustrating the coil piece 6 of the axial gap-type rotating electric machine 100 of the embodiment of the invention when viewed from various angles. As illustrated in FIG. 11, the coil piece 6 is opened in the circumferential direction at both sides of the folded portion 20e formed at the center portion. The folded portion 20e is bent in the edge wise direction (the long edge direction of the rectangular wire) of the rectangular conductor. Since the abrupt bending structure of the edge wise direction breaks the insulation coating of enamel or the like in the molding operation, a molding operation is performed so that a smooth bending structure is formed in which an inner circular-arc gap is formed in order to prevent this problem.

Since the folded portion 20e is obtained by bending the rectangular wire in the edge wise direction, the folded portion has strong rigidity and hence the shape of the coil piece 6 can be appropriately maintained. Thus, the connection ends of both ends of the coil piece 6 are easily welded to each other, the coils are easily assembled as the stator coils, and the shape of the assembled stator coil is maintained.

The coil piece 6 further includes inner diameter side open leg portions 20d and 20f which are opened in the circumferential direction of the rotation shaft from both sides of the folded portion 20e, linear portions 20c and 20g which are bent from the inner diameter side open leg portions so as to pass through the core slot 7 of the stator from the inner diameter side toward the outer diameter side, and outer diameter side open leg portions 20b and 20h which are opened in the circumferential direction of the rotation shaft at the outer diameter side of the stator from the linear portions 20c and 20g and are connected to the connection ends. The connection ends 20a and 20i extend linearly in the radial direction from the outer diameter side open leg portions 20b and 20h.

As described above, the folded portion 20e is bent in the edge wise direction, but the folded conductor is largely displaced in the rotation axis direction due to this structure. Thus, this displacement needs to be corrected. That is, since the folded conductor passes through the slot 7 so as to be connected to the connection end of the other coil piece at the core outer diameter side, each position needs to be corrected to an appropriate position. This correction is performed in a manner such that the coil piece is bent in the rotation axis direction to any one of the inner diameter side open leg portions 20d and 20f from the folded portion 20e to the core slot 7. In the embodiment, the coil piece is bent at the inner diameter side open leg portion 20f.

Figure 12:
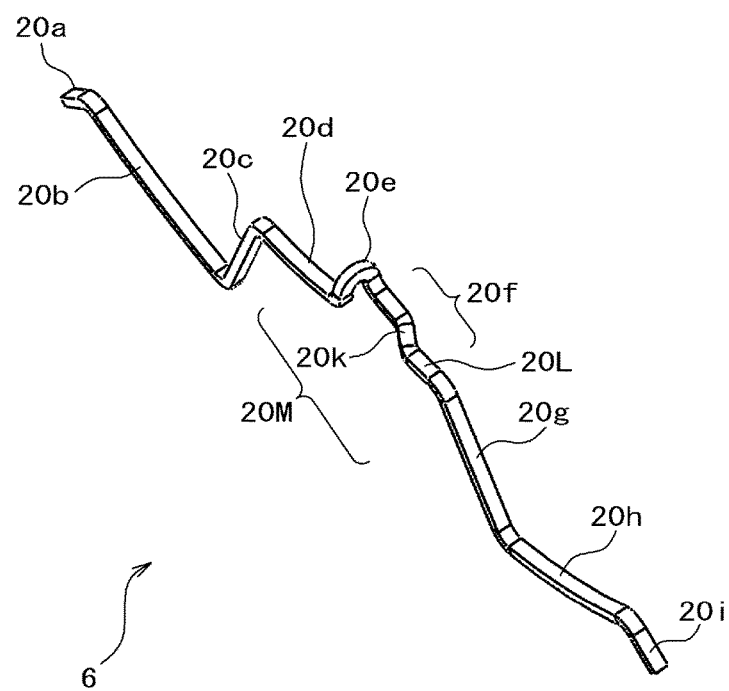
FIG. 12 is a perspective view illustrating the configuration of a coil piece unit.

As illustrated in FIG. 12, the inner diameter side open leg portion 20f includes a correction portion 20k which is bent in the rotation axis direction so as to correct the displacement of the folded conductor and a linear portion 20L which is connected to the correction portion 20k. The bending direction of the correction portion 20k is opposite to the bending direction of the folded portion 20e. The linear portion 20L defines the axial position of the connected linear portion 20g passing through the core slot and the axial position of the connected connection end 20i. That is, the linear portion 20g passing through the core slot is located at the lower layer of the core slot and the connection end 20i is provided below the connection end 20a of the other coil piece by the linear portion 20L and the bending amount of the correction portion 20k. The linear portion 20b of the other coil piece is located at the upper layer of the linear portion 20g located at the lower layer of the core slot disposed as described above.

Figure 13:
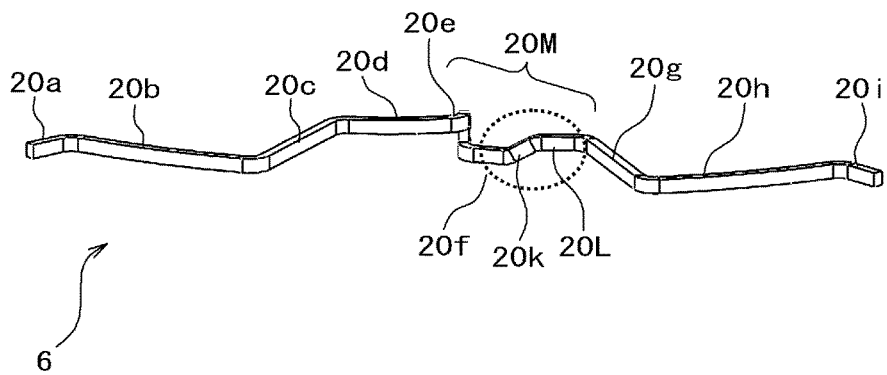
FIG. 13 is a perspective view illustrating the coil piece unit of FIG. 12 when viewed at a different angle.
Figure 14:
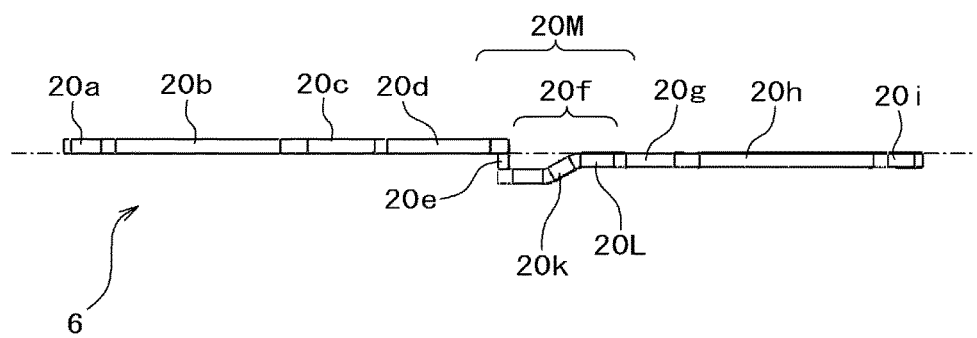
FIG. 14 is a side view illustrating a coil piece unit.

FIGS. 13 and 14 illustrate the above-described structure when viewed at different angle. In FIG. 13, the above-described structure is illustrated by a dashed-line circled part. Due to the correction of the position, the upper surface of the linear portion 20L connected to the correction portion 20k matches each of the upper surfaces of the connection end 20i, the outer diameter side open leg portion 20h, and the linear portion 20g passing through the core slot as indicated by the one-dotted chain line of FIG. 14. Then, the above-described position matches the position of each of the lower surfaces of the connection end 20a, the outer diameter side open leg portion 20b, the linear portion 20c passing through the core slot, and the inner diameter side open leg portion 20d extending from the folded portion 20e in the opposite direction. Further, when both connection ends elastically contact each other so that the lower surface of the connection end 20a is slightly located below the upper surface of the connection end 20i, a welding operation can be easily performed.

Incidentally, since a portion including the core inner diameter side open leg portion 20f and the folded portion 20e of the coil piece 6 is deformed in the axis direction plural times, a swelling structure is formed in the rotation axis direction and the inner diameter direction on the whole. In FIGS. 12 to 14, the swelling structure is indicated by a swelling portion 20M.

Figure 15:
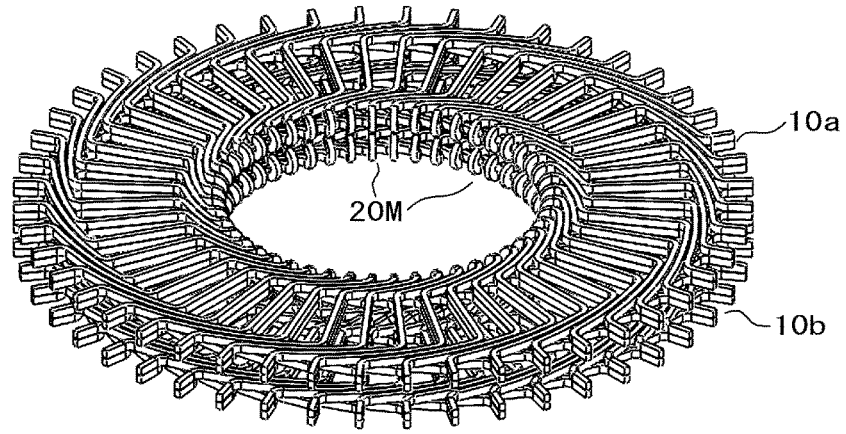
FIG. 15 is a perspective view illustrating two sets of upper and lower stator coils.
Figure 16A:
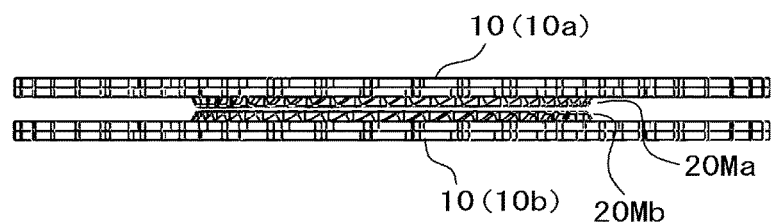
FIG. 16A is an explanatory diagram illustrating the stator coils of FIG. 15.
Figure 16B:
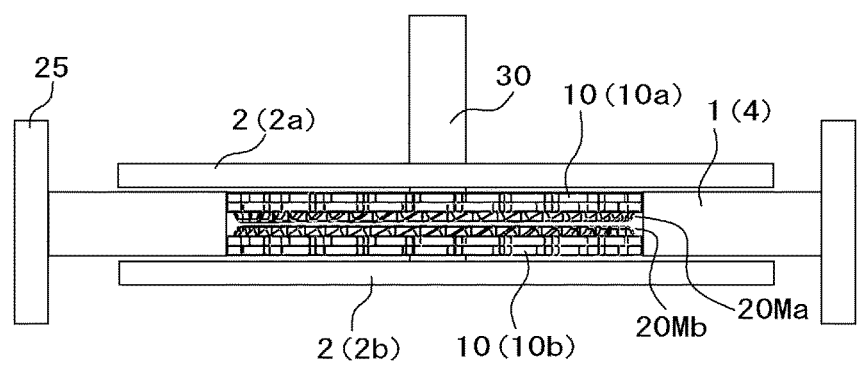
FIG. 16B is an explanatory diagram illustrating a state where the stator coils of FIG. 15 are assembled to a rotating electric machine.

FIGS. 15 and 16A illustrate only the upper and lower stator coils 10a and 10b of the axial gap-type rotating electric machine 100 of the embodiment of the invention. The swelling portion is indicated as an upper swelling portion 20Ma and a lower swelling portion 20Mb which protrude toward the core inner diameter side and protrude in a direction opposite to both rotors 2 so as to face each other as illustrated in FIG. 16B. According to this configuration, since both surfaces of the stator 1 can face the rotors 2a and 2b with a small void gap therebetween while the swelling portion 20M is not interposed therebetween, the axial length of the axial gap-type rotating electric machine can be decreased and the performance of the rotating electric machine is not degraded.

As illustrated in FIG. 6, the core 5 is fixed to the holding member 4 and the fixed portion is located at the inner diameter side of the annular holding member. However, this portion is a space that does not contribute to the performance of the rotating electric machine. In the embodiment, the swelling portion 20M is disposed in the space that does not contribute to the performance of the rotating electric machine so that the swelling portion protrudes toward the inner diameter side. When the swelling portion 20M is disposed near the center portion of the holding member in this way, the radial dimension of the stator coil can be decreased and the performance of the rotating electric machine is not degraded.

Further, even when one stator coil 10 is provided and one rotor 2 is disposed so as to face the stator coil, the swelling portion 20M is disposed so as to protrude in a direction opposite to the rotor 2.

Figure 17:
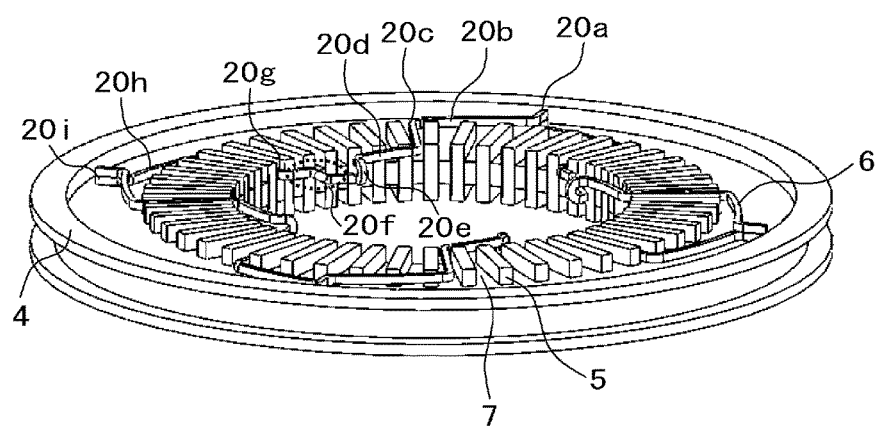
FIG. 17 is an explanatory diagram illustrating a state where a single-phase coil is disposed in a stator.

FIG. 17 is a schematic diagram illustrating a state where a single-phase coil is disposed in the core 5 and the holding member 4 of the axial gap-type rotating electric machine 100 of the embodiment of the invention. As described above, the swelling portion including the core inner diameter side open leg portion 20f and the folded portion 20e of the coil piece 6 is disposed so as to protrude in the inner diameter direction at the lower side of the axis direction opposite to the rotor 2 while being surrounded by a dashed circle of FIG. 17.

Second Embodiment

Figure 18:
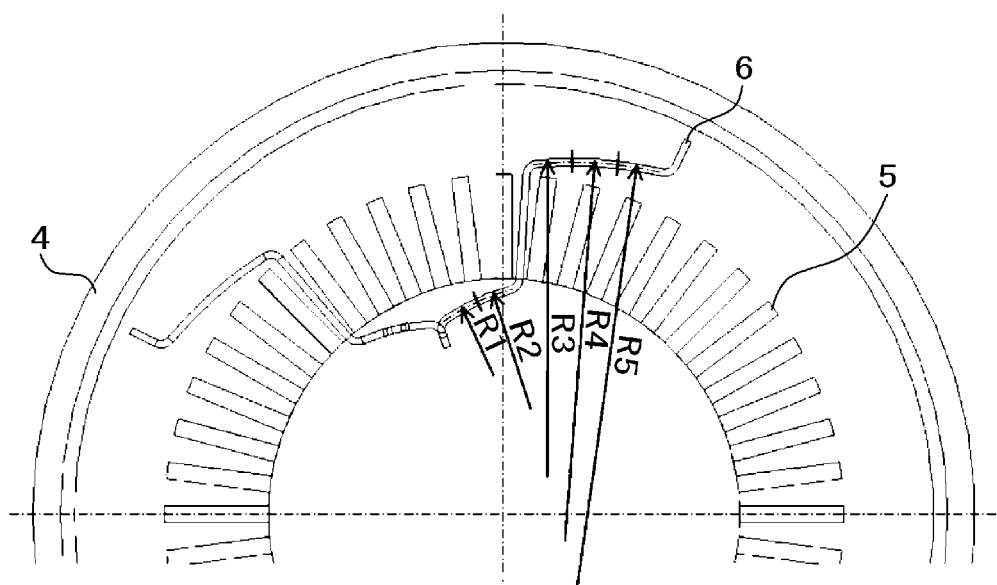
FIG. 18 is a schematic diagram illustrating the shape of an open leg portion of a coil piece.

FIG. 18 is a schematic front view illustrating a state where the coil piece 6 is disposed in the core 5 and the holding member 4 of the axial gap-type rotating electric machine 100 of a second embodiment of the invention. As described above, since each of the inner diameter side open leg portion and the outer diameter side open leg portion in the circumferential direction of the coil piece 6 is formed in a circular-arc shape, the coil pieces can be disposed at a predetermined radial gap therebetween and hence the coil end dimensions at the inner diameter side and the outer diameter side of the rotating electric machine can be decreased.

In order to further decrease the coil end dimensions at the inner diameter side and the outer diameter side, each open leg portion in the circumferential direction of the coil piece 6 is divided into a plurality of circular-arc or linear parts and the parts are combined with each other (a combination of circular-arc parts, a combination of circular-arc and linear parts, or a combination of linear parts) as illustrated in FIG. 18.

With such a configuration, a complex free curve shape (for example, a parabola shape) can be also used instead of a simple circular-arc shape. In FIG. 18, the inner diameter side is divided into two parts (curvature radiuses R1 and R2) and the outer diameter side is divided into three parts (the curvature radiuses R3, R4, and R5). By using the circular-arc shapes having five different curvature radiuses, the open leg portion of the circumferential direction of the coil piece 6 is formed. In this method, a radial gap between the coil pieces can be designed to be approximately zero. However, when the gap is approximately zero, there is a need to thicken the insulation material (for example, enamel) of the insulation-coated rectangular conductor in order to improve the insulation strength.

Furthermore, according to the configuration in which the parts are formed in circular-arc and/or linear shapes and are combined with each other, a molding operation is easily performed compared with the case where all parts are formed in a circular-arc shape and the shape of the molded part can be easily maintained. For this reason, the working efficiency can be improved.

Third Embodiment

In a third embodiment, a method of assembling the stator coil to the core and the holding member will be described.

Figure 19:
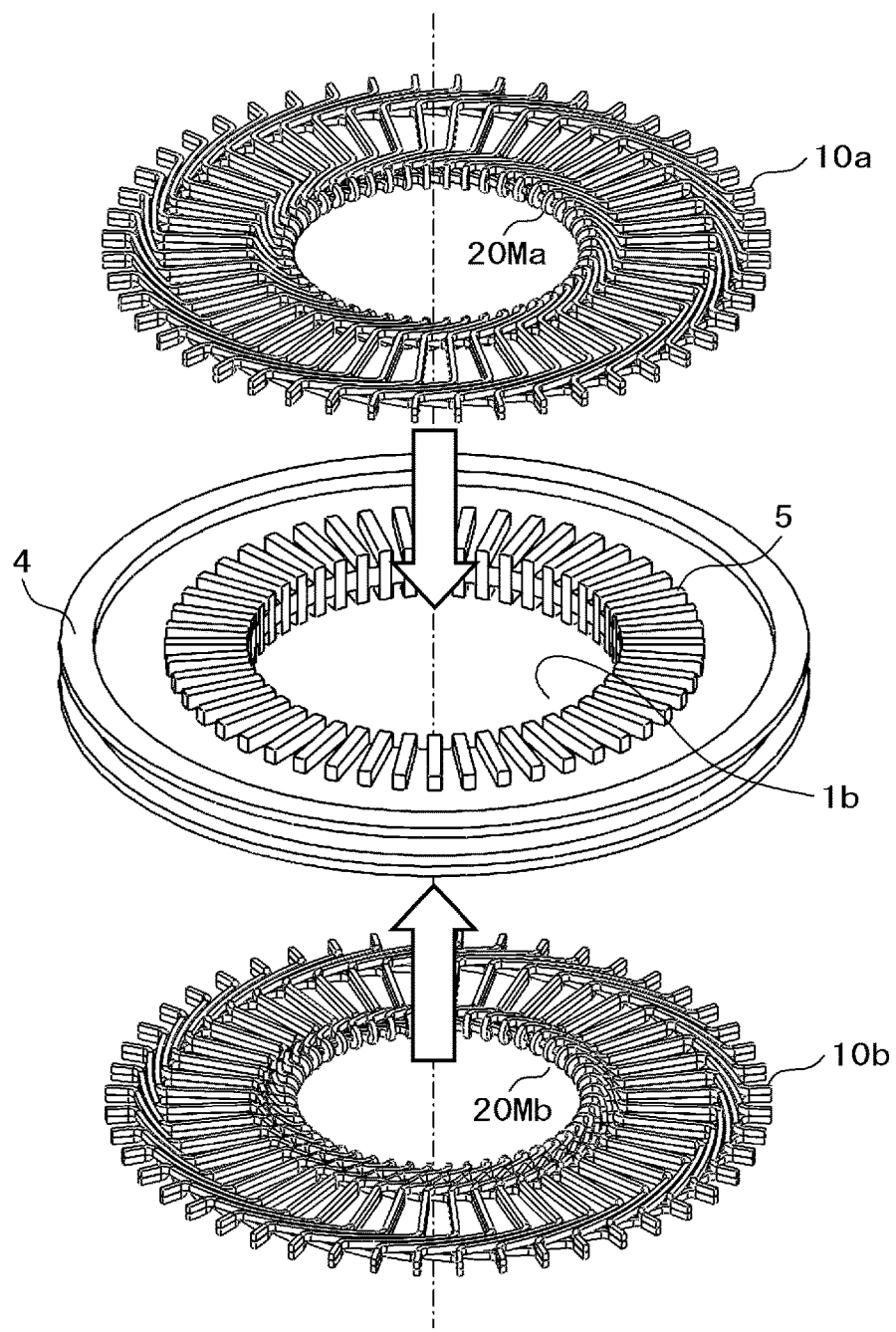
FIG. 19 is an explanatory diagram illustrating a state where a stator coil is assembled to both surfaces of a stator.

FIG. 19 is a schematic diagram illustrating a method of assembling the stator coils 10a and 10b to the core 5 and the holding member 4 of the axial gap-type rotating electric machine 100. As illustrated in FIG. 19, the stator coils 10a and 10b are characterized in that the connection ends of the coil pieces are connected to each other by welding or the like so as to be assembled in advance, the stator coils are disposed so as to be coaxial to the core 5 and the holding member 4, and the stator coils are assembled while sandwiching the core and the holding member.

That is, the stator coils 10a and 10b are formed by the coil pieces 6 disposed in the circumferential direction of the rotation shaft. Here, the stator coils are assembled in a manner such that the adjacent connection ends of the coil pieces 6 at the outer diameter side of the stator are connected to each other. Then, the stator coils 10a and 10b assembled in advance are disposed so as to be coaxial to the core slot 7 of both surfaces while the stator 4 is sandwiched therebetween as indicated by the arrow. Subsequently, the stator and the stator coil are assembled.

Subsequently, as illustrated in FIGS. 1 and 2, two rotors 2 are assembled while being disposed so as to face both surfaces of the stator 4 having the stator coils 10a and 10b disposed therein with a gap therebetween.

As described above, since the shape of the coil piece can be maintained satisfactorily, the workability is good when the stator coil is assembled in advance and the workability is also good when the assembled stator coil is disposed in the core slot 7 of the stator 4.

When the stator coil 10 and the rotor 2 makes a pair, the stator coil is disposed on one surface of the stator so as to be assembled thereto in advance and the stator and the stator coil are assembled. Subsequently, one of the rotors illustrated in FIGS. 1 and 2 is assembled so as to face the surface of the stator having the stator coil disposed therein with a gap interposed therebetween.

According to this manufacturing method, the connection end of the stator coil is disposed on the circumference at the outer diameter side, a space for fixing the connection end by a jig (not illustrated) can be ensured, and a welding torch can be disposed in the space. Thus, both connection ends of the coil piece 6 can be highly precisely welded while being fixed by the jig and hence the welded stator coil can be highly precisely assembled to the core slot of the holding member 4 without any interference. Accordingly, the assembling efficiency can be improved and the manufacturing cost can be decreased.

Further, a stator coil fixing method will be described. As an example, a welded stator coil can be adhered to the holding member and the core by using a rectangular conductor in which an insulation-coating portion is further covered by an adhesive layer. Further, in the stator coil structure illustrated in FIGS. 10B and 10C, the connection ends can be welded to each other after the stator coil, the holding member, and the core are fixed to one another by adhering. In the stator coil structure illustrated in FIGS. 10B and 10C, a jig for fixing the connection ends can be disposed or a welding torch can be disposed above the connection ends.

REFERENCE SIGNS LIST

1: stator
1a: outer diameter side of stator
1b: inner diameter side of stator
2 (2a, 2b): rotor
3: magnet
4: holding member
5: core
6: coil piece
7: core slot (slot)
10 (10a, 10b): stator coil
20e: folded portion
20d, 20f: core inner diameter side open leg portion
20c, 20g: linear portion
20b, 20h: core outer diameter side open leg portion
20a, 20i, 20j, 20n: connection end
20k: correction portion
20L: linear portion
20M (20Ma, 20Mb): swelling portion
100: axial gap-type rotating electric machine

The invention claimed is:

1. A stator coil disposed in a stator of an axial gap-type rotating electric machine rotating a rotor, comprising:
a plurality of coil pieces as rectangular conductors disposed in the circumferential direction of a rotation shaft of the rotor and formed by connecting adjacent connection ends to each other at the outer diameter side of the stator,
wherein each coil piece includes a folded portion folded in the rotation axis direction at the inner diameter side of the stator, an inner diameter side open leg portion opened in the circumferential direction of the rotation shaft from both sides of the folded portion, a linear portion bent from each inner diameter side open leg portion so as to pass through the stator from the inner diameter side toward the outer diameter side, and an outer diameter side open leg portion opened in the circumferential direction of the rotation shaft from the linear portion and extending to the connection end, and
wherein an inner diameter side open leg portion connected to the folded portion includes a correction portion correcting the position of the rectangular conductor and the connection end connected to the correction portion is evenly disposed with respect to the connection end of the adjacent coil piece.

2. The stator coil according to claim 1,
wherein the correction portion of the folded portion is bent in the rotation axis direction and the adjacent connection ends at the outer diameter side of the stator are connected to each other while the rectangular conductors overlap each other in the rotation axis direction.

3. The stator coil according to claim 1,
wherein the adjacent connection ends at the outer diameter side of the stator are bent in the rotation axis direction and are connected to each other while overlapping each other in the radial direction.

4. The stator coil according to claim 1,
wherein the coil piece forms a swelling portion by the folded portion and the inner diameter side open leg portion and the swelling portion is disposed at the inner diameter side of the stator so as to protrude in the axis direction opposite to the rotor.

5. The stator coil according to claim 1,
wherein the inner diameter side open leg portion and the outer diameter side open leg portion of the coil piece are formed in a manner such that the portions are formed in circular-arc or linear shapes and are combined with each other.

6. An axial gap-type rotating electric machine comprising:
a rotor rotating around a rotation shaft;
a stator disposed so as to face the rotor with a void gap interposed therebetween; and
a stator coil disposed in the stator,
wherein the stator coil is excited so as to rotate the rotor,
wherein the stator coil is formed by a plurality of coil pieces as rectangular conductors disposed in the circumferential direction of the rotation shaft and formed by connecting adjacent connection ends to each other at the outer diameter side of the stator, wherein each coil piece includes a folded portion folded in the rotation axis direction at the inner diameter side of the stator, an inner diameter side open leg portion opened in the circumferential direction of the rotation shaft from both sides of the folded portion, a linear portion bent from each inner diameter side open leg portion so as to pass through the stator from the inner diameter side toward the outer diameter side, and an outer diameter side open leg portion opened in the circumferential direction of the rotation shaft from the linear portion and extending to the connection end, and wherein an inner diameter side open leg portion connected to the folded portion includes a correction portion correcting the position of the rectangular conductor and the connection end connected to the correction portion is evenly disposed with respect to the connection end of the adjacent coil piece.

7. The axial gap-type rotating electric machine according to claim 6,
wherein the correction portion of the folded portion is bent in the rotation axis direction and the adjacent connection ends at the outer diameter side of the stator are connected to each other while the rectangular conductors overlap each other in the rotation axis direction.

8. The axial gap-type rotating electric machine according to claim 6,
wherein the adjacent connection ends at the outer diameter side of the stator are bent in the rotation axis direction and are connected to each other while overlapping each other in the radial direction.

9. The axial gap-type rotating electric machine according to claim 6,
wherein the coil piece forms a swelling portion by the folded portion and the inner diameter side open leg portion and the swelling portion is disposed at the inner diameter side of the stator so as to protrude in the axis direction opposite to the rotor.

10. The axial gap-type rotating electric machine according to claim 9,
wherein the stator coil is disposed as two sets on both surfaces of the stator, the rotor is coaxially disposed so as to face both surfaces of the stator, and the swelling portion is disposed so as to protrude toward the stator.

11. A method for manufacturing an axial gap-type rotating electric machine including a rotor rotating about a rotation shaft, a stator disposed so as to face the rotor with a void gap interposed therebetween, and a stator coil disposed in a core slot of the stator,
wherein the stator coil is formed by a plurality of coil pieces disposed in the circumferential direction of the rotation shaft,
wherein each coil piece includes a folded portion folded in the rotation axis direction at the inner diameter side of the stator, an inner diameter side open leg portion opened in the circumferential direction of the rotation shaft from both sides of the folded portion, a linear portion bent from each inner diameter side open leg portion so as to pass through the stator from the inner diameter side toward the outer diameter side, and an outer diameter side open leg portion opened in the circumferential direction of the rotation shaft from the linear portion and extending to the connection end, comprising:
assembling the stator coil in advance while adjacent connection ends of the coil pieces at the outer diameter side of the stator are connected to each other;
disposing the previously assembled stator coil in the core slot of the stator; and
disposing the rotor so as to face the stator having the stator coil disposed therein.

12. The axial gap-type rotating electric machine manufacturing method according to claim 11,
wherein the rotor is provided as two sets on the rotation shaft, the stator coil is coaxially provided as two sets, and the stator includes a plurality of cores and a plurality of core slots disposed in the circumferential direction of the rotation shaft on both surfaces of the stator,
disposing the previously assembled stator coil in the core slots with both surfaces of the stator interposed therebetween; and
assembling two sets of rotors while being disposed so as to face each other with both surfaces of the stator, having the stator coil disposed therein, interposed therebetween.

* * * * *